Sept. 3, 1963 E. P. WIGNER 3,102,851
NEUTRONIC REACTION SYSTEM
Filed March 19, 1947 4 Sheets-Sheet 1

Inventor
Eugene P. Wigner
By
Robert A. [signature]
Attorney

Sept. 3, 1963     E. P. WIGNER     3,102,851
NEUTRONIC REACTION SYSTEM
Filed March 19, 1947     4 Sheets—Sheet 4

Inventor:
Eugene P. Wigner
By Robert A. [Forrester]
Attorney

United States Patent Office 3,102,851
Patented Sept. 3, 1963

3,102,851
NEUTRONIC REACTION SYSTEM
Eugene P. Wigner, Oak Ridge, Tenn., assignor to the United States of America as represented by the United States Atomic Energy Commission
Filed Mar. 19, 1947, Ser. No. 735,683
3 Claims. (Cl. 204—193.2)

This invention relates to nuclear physics, and more particularly to a novel method and means for producing power and fissionable material which may be utilized to sustain a nuclear fission chain reaction.

It is known in the art that a controlled slow neutron chain reaction may be established by combining fissionable material and neutron moderator to form a reactive mass, the moderator being effective to reduce the average neutron energy to a value at which the fission cross section of said material is relatively great.

In slow neutron reactors a thermally fissionable isotope such as $U^{233}$, $U^{235}$, or $Pu^{239}$ or mixtures thereof is subjected to fission by absorption of neutrons and a self-sustaining chain reaction is established by the neutrons evolved by the fission. In general, such reactors comprise bodies of compositions containing fissionable material such, for example, as natural uranium, disposed in a neutron slowing material which slows the neutrons to thermal energies (about 0.03 e.v.). Such a slowing material is termed a neutron moderator. Carbon and heavy water ($D_2O$) are typical moderators suitable for such use. Heat is evolved during the reaction which is removed by passage of a coolant through the reactor or in heat exchange relationship therewith. Specific details of the theory and essential characteristics of such reactors are set forth in a copending application of Enrico Fermi and Leo Szilard, Serial No. 568,904, filed December 19, 1944, now Patent No. 2,708,656.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently, a system of finite size may be said to have a K constant, even though the value thereof would only exist if the system as built were extended to infinity without change of geometry or materials. Thus, when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The actual neutron reproduction ratio in a system of finite size, therefore, differs from K by the external leakage factor, and by a factor due to the neutron absorption by localized neutron absorber, and the actual reproduction ratio of the finite-sized system, R, must still be sufficiently greater than unity to permit the neutron density to rise exponentially with time in the system as built.

During the interchange of neutrons in a neutron moderated system of finite size, comprising bodies of any size disposed in a neutron moderator, neutrons may be lost to the chain reaction in four ways: by absorption or capture in the uranium content of the bodies without producing fission; by absorption or capture in the moderator material; by absorption or capture by the impurities present in both the uranium bodies and the moderator; and by leakage out of the system through the periphery thereof. In a fast reactor all of these losses, except the last, are either substantially eliminated or are greatly reduced.

A primary object of the present invention is to provide a "breeder" system wherein a nuclear fission chain reaction is utilized to produce fissionable material at a rate greater than the rate of consumption of fissionable material within the chain reacting composition. This is accomplished by neutron bombardment of "fertile" material adapted to undergo nuclear reaction productive of fissionable material as hereinafter described. Fertile isotopes as herein defined are isotopes such as $Th^{232}$ and $U^{238}$, which are converted to thermally fissionable isotopes, $U^{233}$ and $Pu^{239}$, respectively, by nuclear reaction under neutron bombardment. These fertile isotopes are fissionable by fast neutrons and substantially non-fissionable by slow neutrons (below about 1000 e.v.) and absorb neutrons fast or slow to undergo the above-mentioned nuclear reactions.

According to the present invention the novel breeder system comprises a neutronic reactor wherein $U^{233}$ and heavy water ($D_2O$) neutron moderator are combined in a chain reacting composition surrounded by a neutron reflector of heavy water containing a fertile isotope or isotopes in solution or in suspension. The fertile material absorbs neutrons emanating from the chain reacting composition and is thus converted to thermally fissionable material.

It has been found in this connection that the $\eta$ of $U^{233}$ or, in other words, the number of neutrons emitted per fission of a $U^{233}$ atom is about 2.37, thus providing a net increase of 1.37 neutrons per fission. If all of these neutrons are absorbed in fertile material such as, for example, thorium atoms, 1.37 $U^{233}$ atoms are produced for each $U^{233}$ atom consumed or destroyed by the chain reaction. However, it will be noted that the loss of as much as 15 percent of the 2.37 neutrons by escape from the system or by parasitic absorption of other materials than the thorium results in a net increase of zero thus preventing the breeding of thermally fissionable material. An enumeration of the losses follows:

(1) Delayed neutrons which may be released outside the pile.

(2) Absorption by materials present in the chain reacting part, such as the moderator and anion in case of solution, bismuth and tubing in case of a second system to be hereinafter described.

(3) Absorption by fission and corrosion products in pile.

(4) Absorption by tank.

(5) Escape in wrong direction.

(6) Absorption by $U^{234}$ formed.

(7) Absorption by Pa.

(8) Absorption by fission and corrosion products in reflector.

(9) Absorption by moderator and coolant in reflector.

(10) Escape from reflectors, particularly of neutrons formed by fission in reflector.

(11) Losses in chemical separations.

Accordingly it is another object of the present invention to reduce the above-mentioned losses to a minimum as hereinafter described.

Still another object of the invention is to design a novel breeder system in which energy released by the reaction is utilized for the production of power. Such an arrangement requires high temperature operation of the system.

The foregoing and other objects and advantages of the invention will become apparent from a consideration of the following specification and the accompanying drawings, wherein.

Figure 1:
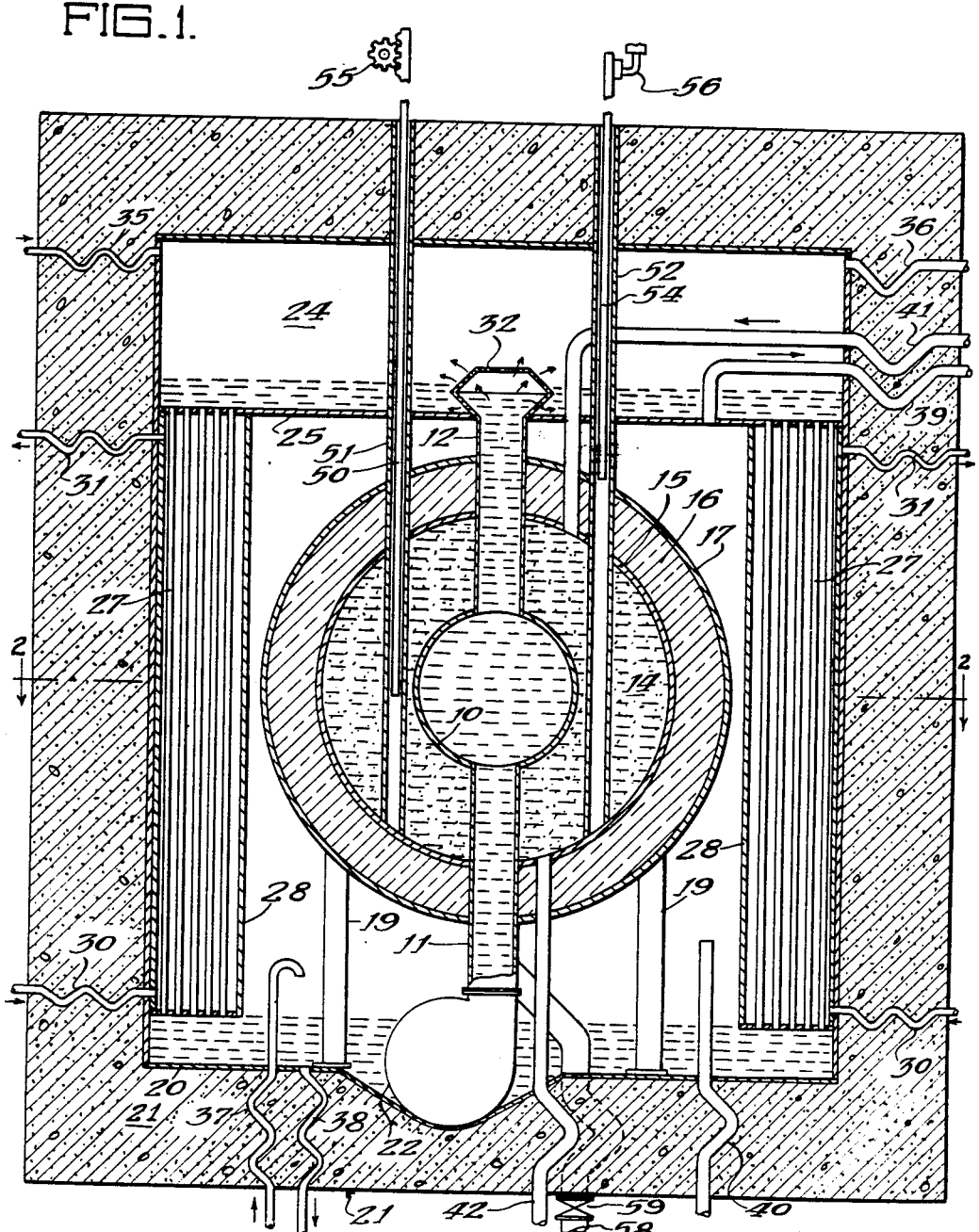
FIG. 1 is a diagrammatic view partly in central vertical cross section and partly in elevation of a neutronic reaction system embodying the invention.
Figure 2:
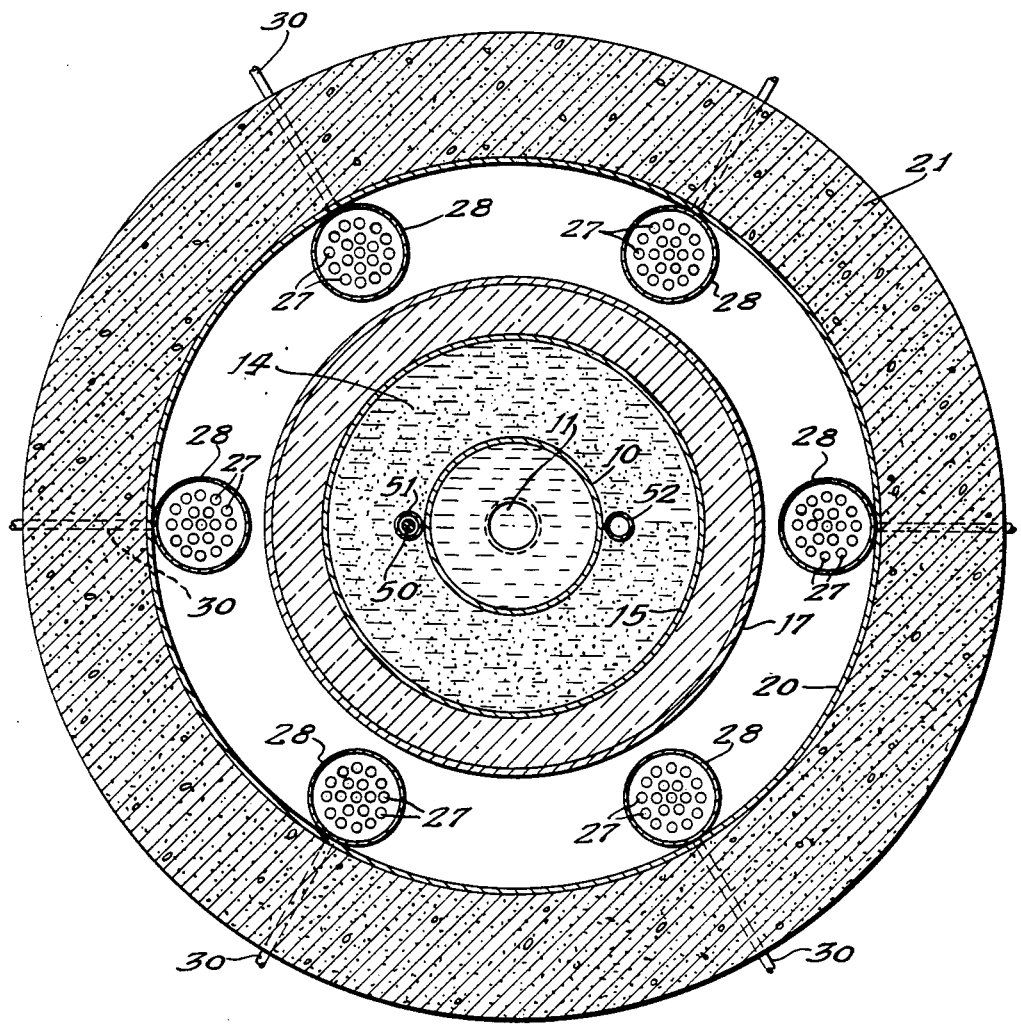
FIG. 2 is a cross sectional view taken on the line 2—2 of FIG. 1.

Describing the invention in detail and referring first to the embodiment thereof illustrated in FIGS. 1 and 2, a reaction tank 10 is provided, said tank being formed of a material such as beryllium, lead or bismuth having a relatively small neutron capture cross section. The tank contains a reactive composition in the form of uranium in heavy water, the uranium being preferably in a compound such as the nitrate, sulfate or fluoride thereof dissolved in the heavy water. The reactive composition is circulated through the tank 10 by means of inlet and outlet conduits 11 and 12, the inlet conduit being connected to the discharge side of a conventional pump 22 and the outlet conduit 12 being connected to an outlet or discharge header 32 from which the reactive solution flows into a high-pressure chamber 24 within a heat exchanger tank or container 20.

The reactive solution flows downwardly from the chamber 24 through heat exchanger tubes 27 disposed within a plurality of tanks 28 spaced around the reaction tank 10 as best seen in FIG. 2, a heat exchange fluid being circulated through each tank 28 by inlet and outlet conduits 30 and 31. The reactive solution flows from the lower ends of tubes 27 into the bottom or low pressure chamber of the tank 20 to the suction side of the beforementioned pump 22.

The tank 10 is surrounded by a tank 15 formed of a material having a relatively small neutron capture cross section such as those mentioned above. The tank 15 contains a neutron reflector of heavy water and fertile material such as, for example, a slurry of approximately 1 gram of $ThO_2$ per cubic centimeter of heavy water. The slurry within the tank 15 is indicated at 14 (FIG. 1) and is circulated by means of inlet and outlet conduits 41 and 42.

The tank 15 is surrounded by another tank 17 formed of a material having a relatively small neutron capture cross section, said tank 17 containing an outer neutron reflector of a material such as graphite or beryllium adapted to reflect neutrons escaping from the inner reflector 14 thus minimizing escape of neutrons from the system. The tank 17 is supported by legs or pedestals 19 seated on the bottom of the tank 20, which is disposed within and is supported by a concrete vault 21 adapted to afford a biological shield around the system.

The reactive composition within the tank 10 is replenished and renewed as desired by means of a make-up line 37 and a drain line 38 communicating with the bottom of the tank 20.

The nuclear fission chain reaction is regulated by a neutron absorbing control rod 50 reciprocated within a tube 51 formed of a material such as beryllium having a relatively small neutron capture cross section. The rod is actuated by a rack and pinion mechanism 55. Emergency control of the reaction is afforded by a safety rod 54 disposed within a beryllium tube 52, said rod being normally maintained in an elevated position by an electrically operated latch 56 which may be released under emergency conditions to permit the rod 54 to move downwardly by force of gravity, thus terminating the chain reaction. Additional emergency control is afforded by an emergency dump line 58 with a dump valve 59 therein, said valve being adapted to be opened under emergency conditions to drain the reactive solution from the tank 10.

As above noted, in a breeder system the neutron losses must be reduced to a minimum and it has been found that a substantial portion of these losses is due to neutron absorption in gaseous fission products such as $xenon^{135}$ formed within the reactive solution 10. These fission products escape within the high pressure chamber 24 and are swept therefrom by an inert gas such as helium pumped through inlet and outlet conduits 35 and 36. Additional gaseous fission products are released within the low pressure chamber at the bottom of the tank 20 and are swept therefrom by an inert gas circulated through the tank 20 by outlet and inlet conduits 39 and 40.

Thus it will be understood that by means of the above-described arrangement, a novel breeder system has been designed wherein neutron losses are reduced to a minimum by utilizing a heavy water neutron moderator within the reactive solution and by surrounding the reactive solution with a heavy water neutron reflector containing the fertile material to be converted under neutron bombardment to thermally fissionable material. It will be understood that heavy water has a neutron capture cross section of approximately zero and is an excellent neutron moderator, thus affording a system from which very few neutrons escape. Furthermore, neutron losses due to absorption in gaseous fission products are reduced to a minimum value as above described.

An operative system of the above-described type may be constructed with a reactive solution according to the following table.

| $D_2O$ (cc.) per gram $U^{233}$ | Critical radius in centimeters | Critical vol. in liters | Vol. of $U^{233}$ in kilograms |
|---|---|---|---|
| 100 | 41.8 | 162 | 1.62 |
| 200 | 46.6 | 241 | 1.20 |
| 300 | 50.9 | 332 | 1.11 |
| 400 | 54.8 | 430 | 1.07 |

It may be noted that the separation of the reactive solution and the fertile reflector 14 by the tank 10 may be eliminated so that the thorium slurry and uranium solution constitutes a single reactive mass, thus eliminating the neutron absorption by the tank 10. However, the critical diameter of the pile in such an arrangement is increased to about 3 meters with a volume of about 14 cubic meters. The amount of $U^{233}$ required for such a pile would be of the order of 70 kilograms and, for this reason, it is preferred to separate the slurry and the solution by the tank 10 to prevent reduction of the neutron multiplication constant within the reactive solution.

Referring now to the modification of the invention shown in FIGS. 3 to 5 inclusive, the neutronic reactor generally designated 60 (FIG. 5), and hereinafter described in detail comprises a reactive solution circulated by means of inlet and outlet lines 62 and 64, the inlet lines or conduits being connected to the discharge side of a pump 71, and the outlet conduit 64 being connected to a heat exchanger 74 adapted to absorb the heat developed within the reactive solution for the purpose of producing power and cooling the solution. The heat exchanger 74 is connected to a purification tank 72 which is connected to the suction side of the before-mentioned pump 71. A perforated wall or screen 75 is disposed within the tank 71 and an inert gas such as helium is pumped through an inlet line 76 upwardly through the screen 75 and through the reactive solution to sweep the gaseous fission products therefrom. The sweeping gas and the gaseous fission products entrained therein are conveyed from the tank 72 by an outlet conduit 77. It may be noted that the reactor 60 comprises a plurality of tubes 70 hereinafter described in detail and adapted to convey the reactive solution through a mass of neutron moderator as hereinafter discussed. Thus, it will be seen that the system diagrammatically illustrated in FIG. 5 comprises a neutronic reactor in the form of a breeder generally designated 60, a heat exchange system 74 for absorbing the heat of the chain reaction to produce power, and a purification tank 72 within which the gaseous fission products of the reaction are removed from the system.

Figure 3:
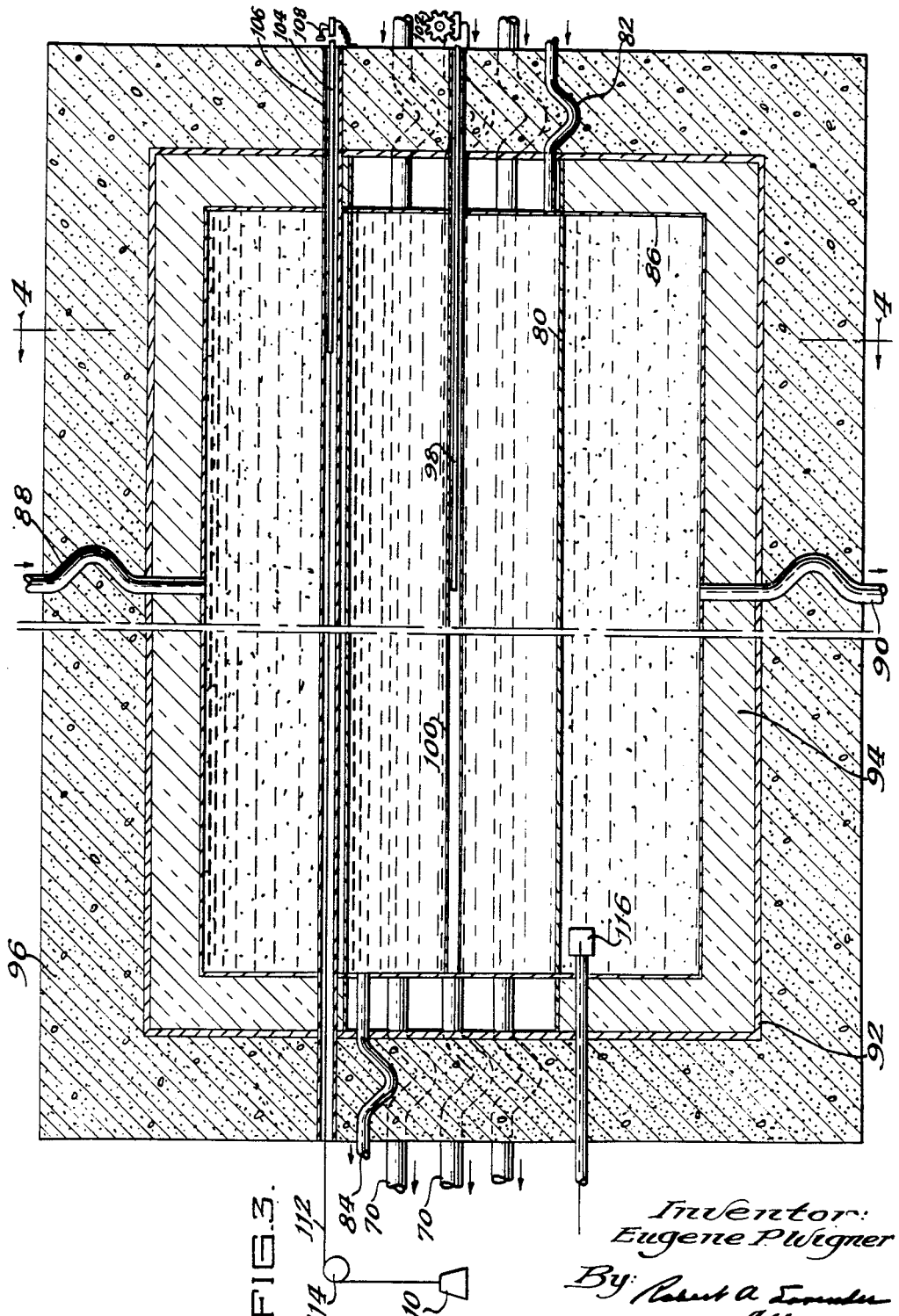
FIG. 3 is a diagrammatic view partly in central vertical cross section and partly in elevation of a modified form of a reaction system embodying the invention.
Figure 4:
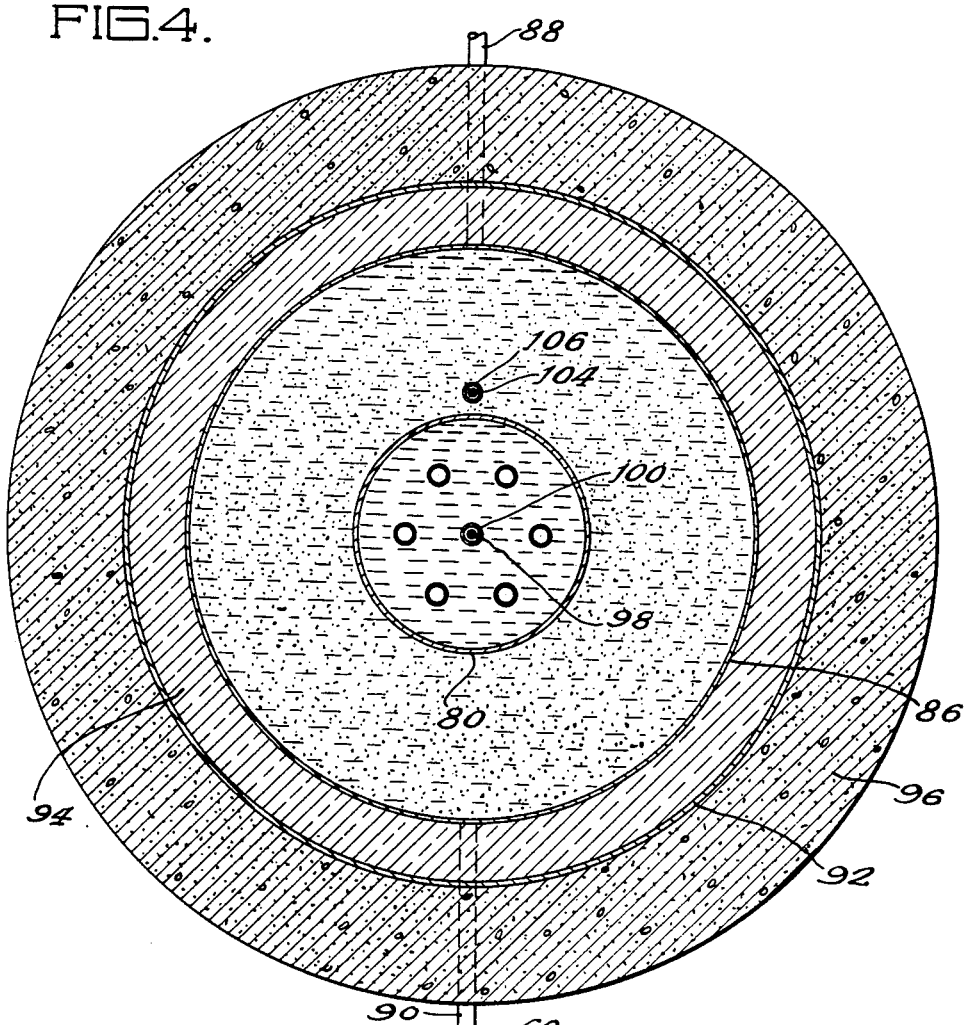
FIG. 4 is a cross sectional view taken on the line 4—4 of FIG. 3.
Figure 5:
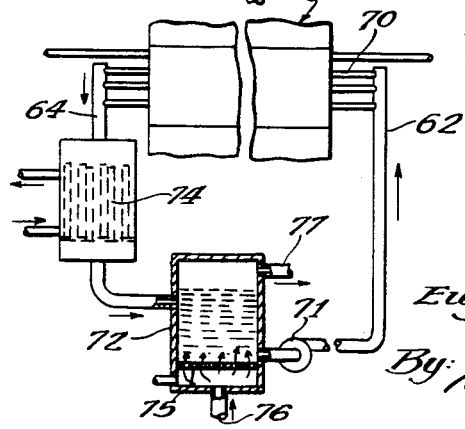
FIG. 5 is a flow diagram illustrating the reaction system of FIGS. 3 and 4 in combination with a heat exchange system for the production of power and a purifier system for removing gaseous fission products from the chain reacting composition.

Referring now to FIGS. 3 and 4, the novel breeder system of FIG. 5 is illustrated in detail and comprises a reaction tank 80 through which the before-mentioned tubes 70 extend, said tubes being formed of a material such as beryllium or lead having a relatively low neutron capture cross section. The tank contains neutron moderator in the form of a mass of heavy water surrounding the tube 70 and circulated by means of inlet and outlet conduits 82 and 84. The tank 80 is disposed within a reflector tank 86 containing a slurry of fertile material and heavy water, as in the previously described embodiment, said slurry being circulated by inlet and outlet conduits 88 and 90.

The tank 86 is, in turn, surrounded by another tank 92 which contains an outer neutron reflector 94 in the form of beryllium or graphite. The tank 92 is enclosed within and supported by a concrete vault 96 affording a biological shield around the system.

The nuclear fission chain reaction within the tank 80 is controlled by a neutron absorbent control rod 98 reciprocable within a permeable tube 100 formed of a material such as beryllium having a small neutron capture cross section, and the rod 98 is actuated by a rack and pinion mechanism 102. Emergency control of the reaction is provided by a neutron absorbent control rod 104 disposed within a neutron permeable tube 106 and held in the retracted position shown in FIG. 3 by an electrically operated latch 108. Under emergency conditions, the latch is released and the rod 104 is drawn into the central portion of the system by means of a weight 110 connected to the rod 104 by a line 112 supported by a pulley 114. The neutron density within the system is monitored by a conventional ionization chamber 116 connected in a conventional manner to an electrical circuit (not shown) for measuring the neutron density.

In the arrangement of FIGS. 3 and 4, the uranium compound is dissolved in bismuth in a ratio of about 1 gram to 25 cubic centimeters. The solution is circulated through the tubes 70 which passes as above described through the heavy water neutron moderator in the tank 80 to define therewith a neutronic reactor in which neutron losses are reduced to a minimum as above described. It may be noted that the heavy water within the tank 80 is preferably circulated, degassed, and cooled externally of the tank 80 by a system (not shown) such as that utilized in FIG. 5 for cooling and degassing the uranium bismuth solution. If desired, a mixture of $UF_6$ and a fluorocarbon of low neutron cross-section may be substituted for the uranium bismuth solution where the reactor is to be operated at a relatively low temperature value.

It will be understood that the above-described embodiments of the invention are merely by way of illustration and not limitation inasmuch as various modifications of the system will be readily apparent to those skilled in the art without departing from the spirit of the invention or the scope of the appended claims.

What is claimed is:

1. A neutronic reactor system comprising a heat exchange tank, high and low pressure chambers therein, a plurality of heat exchangers in said tank comprising tubes interconnecting said chambers, a neutronic reactor within said tank comprising a substantially spherical container, a reactive composition within said container consisting essentially of a solution of a $U^{233}$ compound in heavy water in a concentration sufficient to sustain a chain reaction, a second container surrounding said first container and containing a slurry of thorium dioxide in heavy water, inlet and outlet conduits connected to said reaction tank, the outlet conduit being connected to said high pressure chamber, a pump having its suction side connected to the low pressure chamber and its discharge side connected to the inlet conduit, and means for removing gaseous fission products released in both of said chambers.

2. A neutronic reactor system according to claim 1 wherein the reactive composition completely fills the spherical container.

3. A neutronic reactor system according to claim 2 wherein the spherical container has a radius between approximately 41.8 and 54.8 centimeters, the solution of a $U^{233}$ compound in heavy water has a concentration of from 1 gram of $U^{233}$ per 100 cc. of heavy water to 1 gram of $U^{233}$ per 400 cc. of heavy water, and the thorium dioxide slurry contains about 1 gram of thorium dioxide per cc. of heavy water.

References Cited in the file of this patent

UNITED STATES PATENTS

| 2,708,656 | Fermi et al. | May 17, 1955 |
| 2,743,225 | Ohlinger | Apr. 24, 1956 |

FOREIGN PATENTS

| 233,011 | Switzerland | Oct. 2, 1944 |
| 861,390 | France | Oct. 28, 1940 |

OTHER REFERENCES

H. D. Smyth: A General Account of the Development of Methods of Using Atomic Energy for Military Purposes, August 1945; pp. 22 and 177.

Harwell: The British Atomic Energy Research Establishment 1946–1951, London, 1952, pp. 34–42.

Sourcebook on Atomic Energy, by Samuel Glasstone, D. Van Nostrand Co., N.Y., 1950, pp. 400–406.

A Forum Report: Nuclear Reactor Development, July 1954, Atomic Industrial Forum, 260 Madison Ave., New York 16, N.Y., page 18.